Jan. 16, 1934. W. B. PEDELTY Re. 19,049

PULVERIZING PROCESS AND APPARATUS

Original Filed Feb. 27, 1929

INVENTOR.

BY Walter B. Pedelty

Ewing, Wheeler & Wolcott

ATTORNEYS.

Reissued Jan. 16, 1934

Re. 19,049

UNITED STATES PATENT OFFICE 19,049

PULVERIZING PROCESS AND APPARATUS

Walter B. Pedelty, Mason City, Iowa

Original No. 1,783,975, dated December 9, 1930, Serial No. 343,078, February 27, 1929. Application for reissue July 18, 1931. Serial No. 551,782

5 Claims. (Cl. 83—11)

This invention relates to improvements in pulverizing processes and apparatus of the general type employed for feeding finely divided fuel to furnaces.

In apparatus of this general type it is common to mount upon a single shaft a set of breakers or grinders and a centrifugal fan for delivering the finely divided portions of material into the furnace. In the use of such apparatus for feeding blast furnaces great difficulties have been experienced by reason of the larger particles falling to the bottom of the retort while only partially consumed and becoming mixed with molten metal to form a slag which is very difficult to remove, blasting operations being sometimes resorted to for that purpose.

To overcome this difficulty various expedients have been tried, one of the most common being to provide a wall or shoulder between the breaking or grinding portion of the apparatus and the fan in order to obstruct the passage of the larger fragments into the fan while allowing the smaller fragments to be thrown over such wall or shoulder. This expedient has proven effective to a considerable extent in keeping the larger fragments out of the fan but it has not prevented slag forming fragments from passing through the fan to the furnace.

The primary object of my invention is to reduce pulverizable materials by entraining such materials in an elastic fluid and churning or impacting them against each other in a field or maelstrom of eddies induced by the operation of a centrifugal fan at one side of said field, the materials or fragments of materials being caused to impinge upon each other throughout the field while moving freely and promiscuously in various directions.

My invention is distinguished from a pulverizing apparatus in which materials and air are mechanically propelled and driven into contact with each other in such a manner as to produce crushing and abrading contacts, and which propelling operation requires to be many times repeated in order to reduce solid materials to the condition of a powder or a dust. In the practice of my process, the material is preferably drawn into the pulverizing field by suction and after it has once entered such field it is held in suspense without contact with moving mechanical driving mechanism until reduced to the desired degree of fineness determined by the carrying capacity of an outflowing or centrifugally discharging stream of air.

More particularly stated it is an object of my invention to provide a fan which will effectively agitate small fragments of fuel and similar material or materials capable of being entrained in air and pulverized by impact of one portion upon another within a fan casing and at one side of the fan wings as to cause them to break or pulverize each other so completely that the material may be delivered from the fan casing substantially in the form of dust and whereby solid fuels such as coal may be so pulverized as to be substantially capable of suspension in the heated atmosphere of the furnace or retort until fully consumed.

My invention rests upon the discovery that a fan may be so constructed that the major portion of the material will not reach the space occupied by the wings until after it has been caught in one or more powerful eddies or conflicting air currents and thrown violently against other particles of the material with impacting and grinding effects, whereby the material is almost instantaneously reduced to a size having the characteristic of dust in that it is capable of being held in suspension in the atmosphere for a considerable period of time.

It may therefore be stated that it is an object of this invention to provide a process for utilizing violently agitating air to effect a final pulverization of material and to deliver such material in an air stream wherein it is capable of floating until consumed in a combustion chamber.

In the drawing.

Like parts are identified by the same reference characters throughout the several views.

Figure 1:
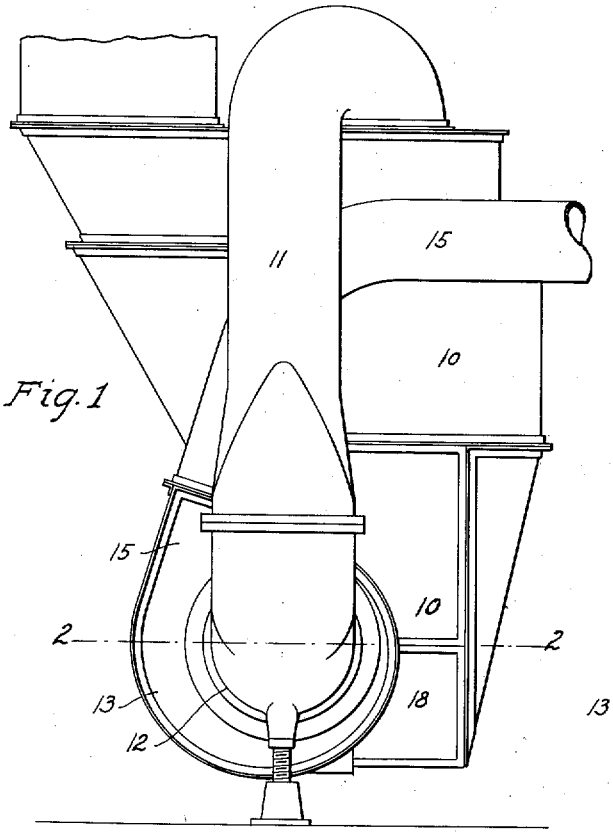
Figure 1 is a side elevation of a pulverizing apparatus embodying my invention.
Figure 3:
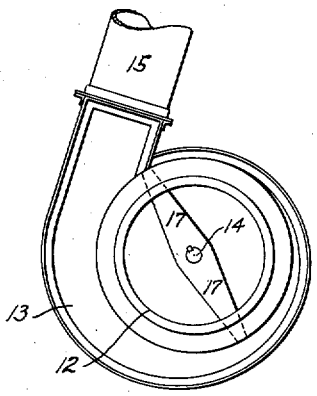
Figure 3 is a detail side view of the fan.
Figure 2:
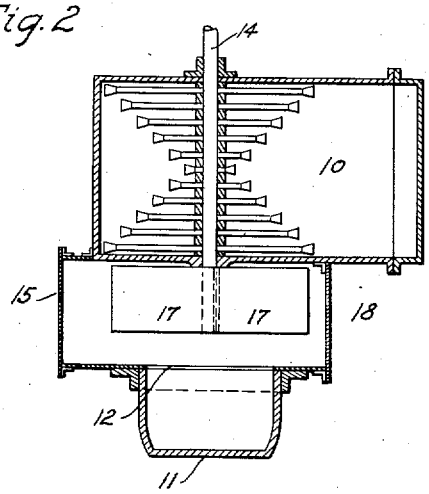
Figure 2 is a sectional view of the fan as taken on line 2—2 of Figure 1.

In the practice of my process I first reduce the material to small fragments by any suitable means, these fragments being preferably of such fineness that they can be entrained and carried in high velocity air streams. Thereupon I feed these fragments into a maelstrom of violently agitating air having a multitude of gyrating or cross currents of such intensity as to entrain the particles of material and throw them violently against each other and against any obstruction in their path. The velocity and force of the air currents is proportioned to the force required for crushing the particles of material when brought in contact with each other in the described manner.

My process also contemplates a continuous delivery of dust laden air from one side of the agitating field in which the fragments are being crushed and a corresponding continuous delivery of fragments to be reduced into said field from another side.

My preferred means for practicing the process and for feeding the material into and out of the space within which the material is being reduced, will now be described more particularly with reference to the accompanying drawing.

In the drawing, a breaker 10 of ordinary construction is conventionally illustrated, from which fuel or other material may be delivered through a chute or passage 11 to an inlet opening 12 of a centrifugal fan casing 13. The breaker and the passage 11 may be of any ordinary construction, or any desired means may be substituted for initially reducing the material into comparatively small fragments such as have heretofore been delivered to furnaces.

The casing 13 is similar in form to the casings of centrifugal fans in common use, the inlet 12 being located at the so called eye or in the side wall of the casing opposite that at which the shaft 14 enters and the outlet passage or chute 15 being tangential in order that the fan wings may throw air and other material in the desired direction.

I have discovered that by mounting upon the shaft 14 a set of fan wings 17, preferably two wings diametrically opposite and of a width approximately one half to nearly two thirds that of the casing, it is possible to set up gyrating currents and cross currents in the portion of the casing between the wings and the inlet side, and thereby throw the fragments of material violently against each other and against the peripheral wall portion 18 of the casing in such a manner as to almost instantly reduce said fragments to dust.

If the fragments enter the spaces between the wings 17 to any considerable extent I am unable to find any evidence of that fact. The wing surfaces do not become polished and the encircling peripheral portion of the casing does not become polished, even after prolonged periods of use. It is evident that if any fragments enter the space between the wings they are immediately thrown laterally and caught in the swirls and cross currents at the side of the wings. Air and finely divided particles are, however, constantly delivered through the outlet chute 15 in which no fragments of sufficient size to be classed as other than dust have as yet been discovered, although repeated tests have been made of the material passing through this chute.

While eddies and cross currents of great intensity are developed in the unobstructed space between the inlet and the fan, there is little speed of general revolution about the axial line of the fan shaft projected into such space, for the reason that the direct action of the revolving fan is outside of this space, and the eddies tend to break up the revolving air currents which would otherwise be generated by friction of the air which is being carried around by the fan wings in the space occupied by the fan. Therefore, but little centrifugal force is developed as compared with that developed in the peripheral space encircling the fan wings, and the tangentially outflowing air can entrain and carry with it only those particles which have been completely reduced to a substantially impalpable powder or dust.

The rapidity with which fragments of coal or similar material may be reduced to a dust indicates that the vortex or maelstrom developed in the open space between the inlet and the fan wings is composed largely of a multitude of eddies each revolving about its own axis, whereas, all of these eddies also travel in a circular path about the central axis of the fan shaft extended. Also, there appears to be a pulsating movement due to the fact that, as the fan revolves, the air in the space which it occupies tends to become compressed in front of the wings and a vacuum tends to develop in the rear of the wings with the result that the air in front of the wings is not only driven outwardly by centrifugal force, but develops a strong tendency to flow laterally into the space between the fan and that wall of the casing which is provided with the inlet, whereas, air and other material in such space tends to develop a counter-flow toward the rear side of each wing. The air and other material entering through the inlet, is also necessarily flowing in a general direction perpendicular to the plane of the vortex, and the combined effect is to increase the random element to a point where collisions take place with almost inconceivable frequency.

It also appears probable that the multitude of cross currents, developed by the pulsating effects of the fan wings and by the incoming material, operate to so diminish the general movement of revolution about the central axis as to prevent centrifugal force from developing in the vortex space to a degree sufficient to carry the larger fragments out of the vortex zone, and this appears to account for the fact that only dust laden air passes through the outlet chute.

In my improved fan I employ wings 17 having flat convergent surfaces, the wings being therefore wedge shaped, with the tips or outer margins substantially parallel to the shaft axis. Fan wings of this general type are disclosed in my former patent for a centrifugal fan dated September 27, 1927 and numbered 1,463,317 but for the purpose of my present invention I prefer to construct these wings of cast steel, suitably cored to reduce their weight.

Apparently the form of the wings and the fact that but two diametrically opposite wings are employed, are material factors in developing the necessary agitation in the air between the inlet and the wings. However this may be, as compared with results obtainable from some of the other types of fans, it is certain that in a large part the results above described are obtained by reducing the width of the wings so as to allow a considerable space between them and the inlet side of the fan casing. I have found that with wings constructed as above described I obtain the best results by mounting the wings on the shaft in close proximity to the closed wall of the casing and provide space between them and the inlet side of the casing, of a width more than half that of the wings.

Such a fan delivers the fuel dust in a pulsating current of high frequency, and these pulsations are also an effective aid to combustion in that they tend to break up circulation streams of the gases in the combustion chamber.

By employing a two wing fan having a diameter of about twenty two inches from the tip of one wing to the tip of the other with blades about eight inches in width, a casing inlet about sixteen inches in diameter, and an outlet about twelve inches square, with approximately four and one-half inches between the inlet side of the casing and the fan wings, and by revolving such a fan at approximately 2000 R. P. M., I am enabled to completely reduce the coal fragments to a dust and to deliver such dust to a burner in a pulsating current as above described, without causing the fan wings to become abraded or even polished and with only a light polishing effect upon that portion of the casing which encircles the four and one-half inch space at one side of the fan wings.

I claim:

1. The process of pulverizing and feeding fuel consisting in generating a vortex in unobstructed space, feeding air and entrained fragments of fuel into such vortex at one side thereof, and subjecting the vortex at the opposite side to pulsating agitation tending to develop cross currents and counter-currents.

2. The process of pulverizing material, consisting in generating a revolving, churning maelstrom of such material and an elastic fluid within an unobstructed whorl shaped space which includes the axis of the whorl, feeding elastic fluid and material to be pulverized into said maelstrom at one side thereof, and maintaining the entrained material in suspension in the elastic fluid with the particles in shearing relation to each other, and otherwise unsupported and unobstructed as to direction of motion and delivering the pulverized material from said maelstrom tangentially when the particles are sufficiently reduced in size to be carried with portions of the elastic fluid out of said maelstrom by centrifugal force.

3. The process of treating material which consists in generating a vortex, continuously feeding vortex maintaining material into said vortex at one side thereof and along its central axis, and subjecting the vortex at the opposite side to rotative pressure, and continuously releasing material from the peripheral portions of the vortex, the space occupied by said vortex being unobstructed from its axis radially to its peripheral portions.

4. A method of impelling a fluid body laden with pulverulent material, consisting in the development of a vorticose movement of said fluid body within an otherwise unoccupied enclosed space, continuously releasing material laden fluid tangentially from said space and feeding material laden fluid to the central portion of said space, and maintaining said vorticose movement by rotative agitation of fluid at the side of said space opposite the infeeding side.

5. The combination with a casing of the centrifugal fan type provided with a tangential outlet and an inlet in one side wall, said casing having an interior open and unobstructed receiving space extending from the inlet to the central portion of the casing in free communication with the tangential outlet, a shaft extending through the wall of the casing opposite the inlet, and paddle-shaped wings secured to said shaft for revolution at one side of said receiving space and adapted to develop a vorticose movement of air and entrained material in said receiving space while substantially excluding such material from between the wings, whereby the air and entrained material may be propelled through the tangential outlet under the centrifugal force developed in the receiving space, said wings having relatively thick central portions of substantially the same width as the outer portions.

WALTER B. PEDELTY.